Feb. 7, 1950        J. J. MAZZONI        2,496,351
PULSE JET ENGINE WITH TELESCOPIC THRUST AUGMENTER
Filed June 28, 1946
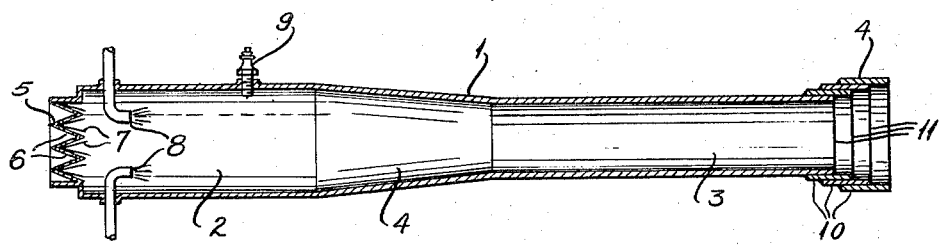
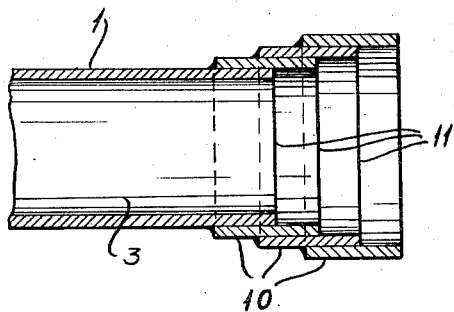
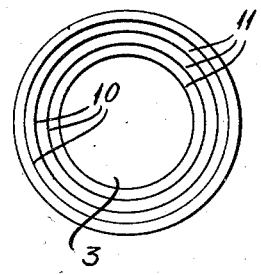
INVENTOR:
James J. Mazzoni,
by Carr Van Gravely,
HIS     ATTORNEYS.

Patented Feb. 7, 1950

2,496,351

UNITED STATES PATENT OFFICE 2,496,351

PULSE JET ENGINE WITH TELESCOPIC THRUST AUGMENTER

James J. Mazzoni, Richmond Heights, Mo., assignor to McDonnell Aircraft Corporation, St. Louis, Mo., a corporation of Maryland Application June 28, 1946, Serial No. 680,114

4 Claims. (Cl. 60—35.6)

This invention relates to jet propulsion engines, particularly intermittent firing jet propulsion engines of the kind known as resojet or pulse jet engines.

The invention has for its principal object a construction that will increase the thrust of engines of the above type, that will permit a reduction in the length of such engines and that is simple and economical to manufacture and may be readily attached to existing operative engines to increase the efficiency thereof or to render operative engines that are inoperative due to improper adjustments. The invention consists in the thrust augmenter for engines of the above type and in the parts and combinations and arrangements of parts hereinafter described and claimed, In the accompanying drawing, which forms part of this specification and wherein like symbols refer to like parts wherever they occur, Fig. 1 is a central longitudinal sectional view of a resojet or pulse jet propulsion engine provided with a thrust augmenter embodying my invention, Fig. 2 is a similar enlarged fragmentary sectional view of the tail end portion of the engine; and Fig. 3 is an end elevational view of said end of said engine.

In the accompanying drawing, my invention is shown embodied in an intermittent firing jet propulsion engine of the type commonly referred to as a resojet or pulse jet engine. This type of engine comprises a hollow cylindrical body 1 having a forward combustion chamber portion 2, a rear or tail pipe portion 3 of reduced diameter and a rearwardly tapering intermediate transition chamber portion 4. Mounted in the forward or head end of the tubular body is an inlet valve comprising a grill 5 with openings 6 therethrough that are covered by inwardly opening spring shutters or flap valves 7. The spring shutters 7 are adapted to open inwardly whenever the pressure inside the combustion chamber 2 is less than the external pressure, thereby allowing air to flow into the combustion chamber through the inlet openings 6 in the head end of the tubular body 1. Liquid fuel is supplied to the combustion chamber 2 by means of one or more fuel injection nozzles 8; and the combustible mixture of air and fuel is ignited in said chamber by means of a spark plug 9 therein. The jet propulsion engine thus far described is well known and it is considered unnecessary to illustrate it in detail.

In operation, as the pressure inside the tubular body 1 of the engine builds up due to combustion, the spring shutters 7 are closed by such pressure, and the combustion gases are ejected at high velocity from the rear end or the tail pipe portion 3 of said body. The resultant high jet velocity produces a forward thrust on the engine. As the combustion gases emerge from the open discharge end of the body 1 at high velocity, a suction is created in the combustion chamber 2 and the shutters 7 are opened by external pressure and permit a fresh charge of air to be drawn into said combustion chamber through the air inlet openings 6 in the grill 5 at the head or inlet end of said body. The above firing cycle is repeated in regularly and continually recurring succession so long as fuel is supplied to the combustion chamber 2 of the engine. The spark plug 9 is used for initial ignition only, after which ignition takes place through spontaneous combustion.

In accordance with the present invention, the hereinbefore described engine is provided with a tubular thrust augmenter which is secured to and forms a rearward continuation of the discharge end of the tail pipe portion 3 of said engine. As shown in the drawing, the thrust augmenter preferably comprises three concentric sleeves 10 that are telescoped one within another and welded or otherwise permanently secured together and to the discharge end of the tail pipe portion 3 of the tubular body 1 to form a rearward extension thereof. The innermost sleeve extends a suitable distance rearwardly of the discharge end of the tail portion 3 of the tubular body 1; and each of the two remaining sleeves also extends a similar distance rearwardly of the sleeve therein. The first sleeve is attached to the tail portion approximately one-half of its longitudinal cross section and likewise each succeeding sleeve is attached to the next preceding sleeve in a similar manner. This telescopic sleeve assembly and mounting form a tail pipe extension in which the rear ends of the tail pipe and sleeves form a series of axially spaced annular steps or shoulders 11 that successively increase in diameter from the rear end of said tail pipe portion to the rear end of the extension thereof.

My understanding of the operation of the hereinbefore thrust augmenter is as follows: When the engine is operating there is a tendency for exterior air to enter the rear end of the tail pipe 3 through the discharge end thereof during the suction part of each cycle and thus reduce the quantity of air drawn in through the uncovered inlet openings 6 in the head or front end of the engine. The series of axially spaced internal annular shoulders or abutments 11 in the tail pipe 3 all face towards the discharge end thereof and function as dams or barriers to reduce or restrict the quantity of air entering said end of said tail pipe without interfering with the discharge of exhaust gases therefrom. This reduction in the volume of outside air permitted to enter the exhaust discharge opening of the engine permits a larger charge of air to be drawn into the combustion chamber 2 through the shutter controlled air inlet openings 6 in the front end thereof; and this larger charge of air picks up a greater quantity of fuel and thus increases the thrust of the engine. The above arrangement is also adapted to increase the thrust of existing engines that are in satisfactory running condition; and it has also been found that the thrust augmenter will enable satisfactory operation of existing engines that were inoperative due to improper adjustments.

Obviously, the hereinbefore described construction admits of considerable modification in the number, longitudinal spacing and diameter of the annular steps or shoulders. Therefore, I do not wish to be limited to the precise arrangement shown and described.

What I claim is.

1. In a pulse jet engine, having an elongated tubular body with an air inlet at the head end and a discharge opening at the rear end comprising a tail pipe, an imperforate sleeve in telescopic relation with the tail pipe, the inner periphery of the sleeve being in direct contact with the tail pipe thus forming an abrupt shoulder adjacent the discharge end of the tail pipe, 2. In a pulse jet engine, having an elongated tubular body with an air inlet at the head end and a discharge opening at the rear end comprising a tail pipe, a plurality of imperforate sleeves in telescopic relation with the tail pipe and with each other, the inner periphery of the first sleeve being in direct contact with the tail pipe and the other sleeves being in direct contact with the next preceding sleeve thus forming a series of abrupt shoulders adjacent the discharge end of the tail pipe.

3. In a pulse jet engine, having an elongated tubular body with an air inlet at the head end and a discharge opening at the rear end comprising a tail pipe, a plurality of imperforate sleeves in telescopic relation with the tail pipe and with each other, the inner periphery of the first sleeve being in direct contact with the tail pipe and the other sleeves being in direct contact with the next preceding sleeve, the sleeves being in contact with the tail pipe and with each other in the manner set forth for approximately one-half the distance of their longitudinal cross section and forming a series of abrupt shoulders adjacent the discharge end of the tail pipe.

4. In a pulse jet engine, having an elongated tubular body with an air inlet at the head end and a discharge opening at the rear end comprising a tail pipe, a plurality of imperforate sleeves in telescopic relation with the tail pipe and with each other, the inner periphery of the first sleeve being in direct contact with the tail pipe and the other sleeves being in direct contact with the next preceding sleeve, the sleeves being in contact with the tail pipe and with each other in the manner set forth for approximately one-half the distance of their longitudinal cross section and forming a series of abrupt shoulders adjacent the discharge end of the tail pipe, whereby air is stopped from entering the tail pipe by said shoulders.

JAMES J. MAZZONI.

REFERENCES CITED

The following references are of record in the file of this patent:

UNITED STATES PATENTS

| Number | Name | Date |
|---|---|---|
| 2,053,336 | Jacobson | Sept. 8, 1936 |
| 2,168,528 | Kadenacy | Aug. 8, 1939 |

FOREIGN PATENTS

| Number | Country | Date |
|---|---|---|
| 83,468 | France | Dec. 7, 1868 |
| 176,838 | Great Britain | Mar. 6, 1922 |